(12) United States Patent
Chiu et al.

(10) Patent No.: US 6,815,519 B2
(45) Date of Patent: Nov. 9, 2004

(54) ACIDIC FLUORINE-CONTAINING POLY (SILOXANE AMIDEIMIDE) SILICA HYBRIDS

(75) Inventors: Yie-Shun Chiu, Tao-Yuan (TW);
Hsing-Tsai Huang, Tao-Yuan (TW);
Te-Chuan Chang, Tao-Yuan (TW);
Gaw-Pying Wang, Tao-Yuan (TW);
Yaw-Shun Hong, Tao-Yuan (TW)

(73) Assignee: Chung-Shan Institute of Science & Technology, Tao-Yuan (TW)

( * ) Notice: Subject to any disclaimer, the term of this patent is extended or adjusted under 35 U.S.C. 154(b) by 0 days.

(21) Appl. No.: 10/103,286

(22) Filed: Mar. 22, 2002

(65) Prior Publication Data

US 2003/0181622 A1 Sep. 25, 2003

(51) Int. Cl.$^7$ .............................................. C08G 77/24
(52) U.S. Cl. ........................... 528/26; 525/477; 528/39; 528/26; 528/38; 528/310
(58) Field of Search .......................... 525/477; 528/39, 528/26, 38, 310

(56) References Cited

U.S. PATENT DOCUMENTS 4,963,635 A * 10/1990 Kunimune et al.
5,932,351 A * 8/1999 Shinada et al.
5,939,520 A * 8/1999 Langsam

OTHER PUBLICATIONS

Chang et al. Organic–inorganic hybrid materials XI. Characterization and degradation of hydrogen–bonded acidic fluorinated poly(siloxane–amideimide–silica) hydrids. Polymer Degradation and Stability, 74(2), 229–237 (2001).*

* cited by examiner

*Primary Examiner*—Kuo-Liang Peng
(74) *Attorney, Agent, or Firm*—Bacon & Thomas, PLLC

(57) ABSTRACT

The present invention discloses an acidic fluorine-containing hybrid having a uniform distribution of an organic and an inorganic components prepared by a sol-gel process. The organic component is a fluorine-containing poly(siloxane amideimide) having a good processing ability, gas permeability, mechanical properties, and chemical stability. The inorganic component is silica having good heat resistance and moisture resistance. The hybrid has excellent properties, such as a good film formation property, a high gas selectivity, a low dielectric constant, a good resistance to scraping, and a good transparency, etc., and can be used in making industrial products, such as gas detection films, sensors, encapsulation material, photoelectrical communication material, and biomedical material, etc.

8 Claims, 3 Drawing Sheets

ACIDIC FLUORINE-CONTAINING POLY (SILOXANE AMIDEIMIDE) SILICA HYBRIDS

FIELD OF THE INVENTION

The present invention relates to the synthesis of a novel acidic fluorine-containing poly(siloxane amideimide)-silica hybrid.

BACKGROUND OF THE INVENTION

Due to its excellent dielectric and mechanical properties at a high temperature and excellent thermo-oxidation stability at 180~220° C. a poly(amideimide) meets the basic application conditions, such as high temperature resistance and insulation property, required by wires and cables. U.S. Pat. No. 5,932,351 discloses a poly(amideimide) having a good mechanical strength at a high temperature, which can be used as a thermo-resistant adhesive. Furthermore, U.S. Pat. No. 5,939,520 discloses a gas mixture separation technique by using a poly(amideimide). However, the applications of a poly(amideimide) are limited because the poly(amideimide) has a relatively high water absorbency (~4 wt %) and thermal expansion (~$5 \times 10^{-5}$ $K^{-1}$).

SUMMARY OF THE INVENTION

In order to improve the properties of the poly(amideimide), the present invention uses a sol-gel process to synthesize an acidic fluorine-containing poly(siloxane amideimide) silica hybrid, which is an organc-inorganic material. An organic-inorganic hybrid synthesized according to the present invention has the following structure:

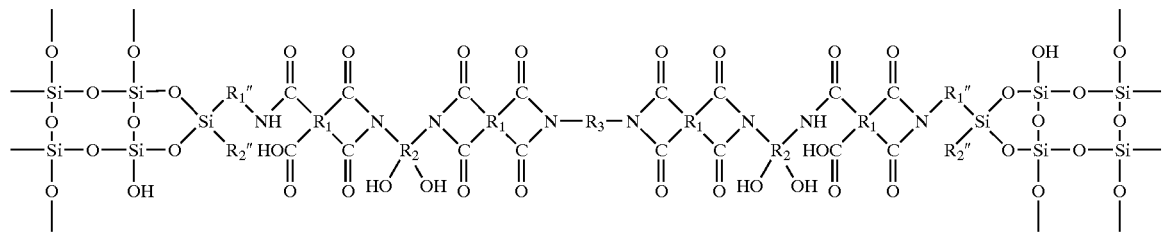

wherein $R_1$ is an organic tetravalent residue from

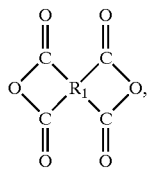

and $R_1$ contains a fluoro substituent;

$R_2$ is an organic tetravalent residue from

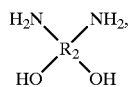

and $R_2$ contains a fluoro substituent;

$R_3$ is

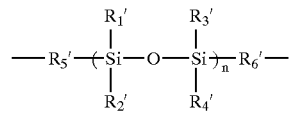

wherein $R'_1$, $R'_2$, $R'_3$ and $R'_4$ are C1–C4 alkyl or phenyl, $R'_5$ and $R'_6$ are C1–C6 alkylene or phenylene, and n=1~10;

$R''_1$ is C1–C4 alkylene or phenylene; and $R''_2$ is C1–C4 alkyl or phenyl.

Preferably, $R_1$ is

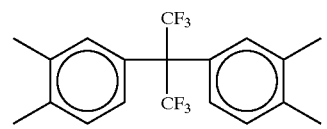

Preferably, $R_2$ is from

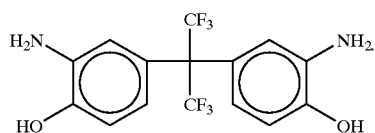

Preferably, $R'_1$, $R'_2$, $R'_3$ and $R'_4$ are methyl, $R'_5$ and $R'_6$ are propylene group, and n=1.

Preferably, $R''_1$ is a propylene group, and $R''_2$ is methyl.

The hybrid of the present invention has a stable bonding between the organic poly(amideimide) and the inorganic silica, while the inorganic silica is uniformly distributed in the organic polymer, thereby improving the mechanical properties, the chemical resistance, and the dimensional and thermal stabilities of the material. This type of organic-inorganic hybrid compound exhibits excellent complementary properties, and can effectively enhance the transparency and wear resistance of the material. The incorporation of the inorganic material is helpful in reducing the permeation activation energy of a specific gas, so that the gas selectivity becomes higher (i.e. selective permeation of a specific gas component in a multi-component gas mixture), and thus increases the gas separation efficiency.

On the other hand, the backbone of the poly(amideimide) can be introduced with functional or active groups, e.g. siloxane, fluoro-containing hydroxy, etc., to broaden the application scope of the poly(amideimide). The direct attachment of a fluoro-containing side chain (e.g. trifluoromethyl, $CF_3$) to the backbone of poly(amideimide) can break the regularity of the molecular chain and reduce the melting point of the polymer, such that the material also possesses a good solubility, a good refractive index, a low water absorbency, a low thermal expansion, and a low dielectric constant value, while maintaining its thermal stability.

The introduction of a soft siloxane monomer in the poly(amideimide) structure can effectively increase the gas permeability and enable the poly(amideimide) exhibiting a lower water absorbency and surface energy, thereby increasing the adhesion and toughness of a poly(amideimide) membrane. While exposing to air, a protective layer will be formed on the poly(siloxane amideimide), which is advantageous in the application of this material as a microelectronic insulation material. Furthermore, the hybrid of the present invention contains an acidic hydroxyl group (—OH), which can adsorb a basic gas, which is particularly advantageous to the separation of an acid/basic gas mixture.

Various successful modification techniques of the acidic fluorine-containing poly(siloxane amideimide)-silica hybrid of the present invention have greatly improved the properties and the potential in many applications of the poly (amideimide). Furthermore, additional reactants may be used to react with the acidic fluorine-containing poly (siloxane amideimide)-silica hybrid of the present invention, creating a series of organic-inorganic hybrid derivatives. Therefore, the hybrid material according to the present invention is versatile in use, and can be easily extended to other applications.

BRIEF DESCRIPTIONS OF THE DRAWINGS

DETAILED DESCRIPTION OF THE INVENTION

Figure 1:
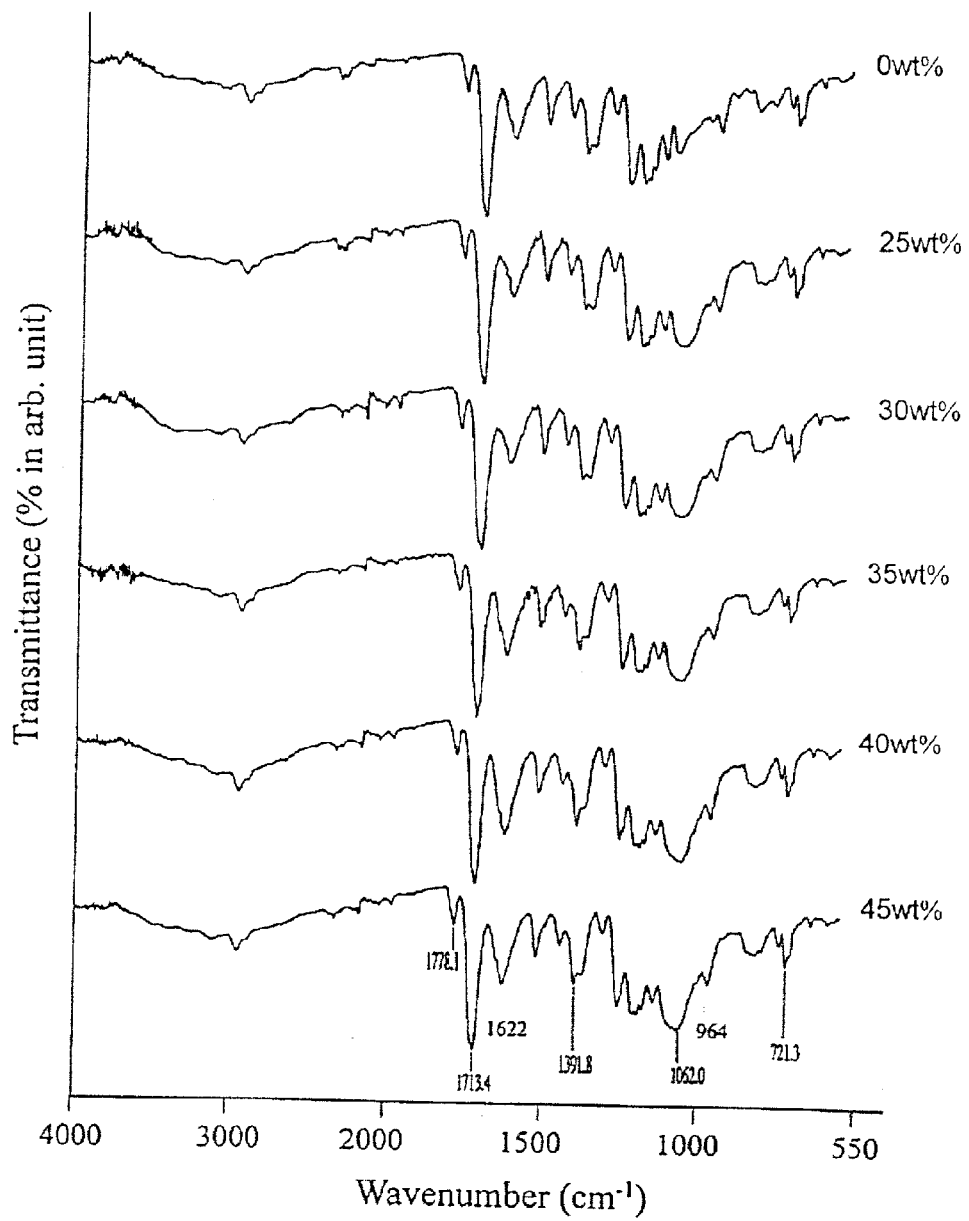
FIG. 1 is an IR spectrum of a fluorine-containing poly (siloxane amideimide)-silica hybrid according to the present invention, wherein the concentrations of the reactant (E) (Si(OR$_4$)$_4$) are, respectively, 0 、25 、 30 、 35 、 40 and 45 wt %.

The present invention provides a novel acidic fluorine-containing poly(siloxane amideimide)-silica hybrid with the following formula (D), which can be synthesized by a method comprising the following steps (a) to (e), which are described by referring to the following Scheme 1:

a) reacting a fluoro-containing dianhydride (reactant A) with a hydroxy-containing diamine (reactant B) at a molar ratio of about 2:1 to form an amic acid (product A);

b) reacting a siloxane diamine (reactant C) with the amic acid product A from step a) at a molar ratio of about 1:1 to form a siloxane amic acid (product B);

c) reacting a dialkoxyl alkyl amino silane with the siloxane amic acid product B from step b) at a molar ratio of about 2:1 to form a fluoro-containing poly(siloxane amic acid) having two terminals of dialkoxyl alkyl silane (product C);

d) reacting a tetraalkoxyl silane (reactant E) with the dialkoxyl-alkyl-silane terminated poly(siloxane amic acid) (product C) from step c); and e) heating the product mixture of step d), thereby obtaining a fluorine-containing poly(siloxane amideimide)-silica hybrid (product D).

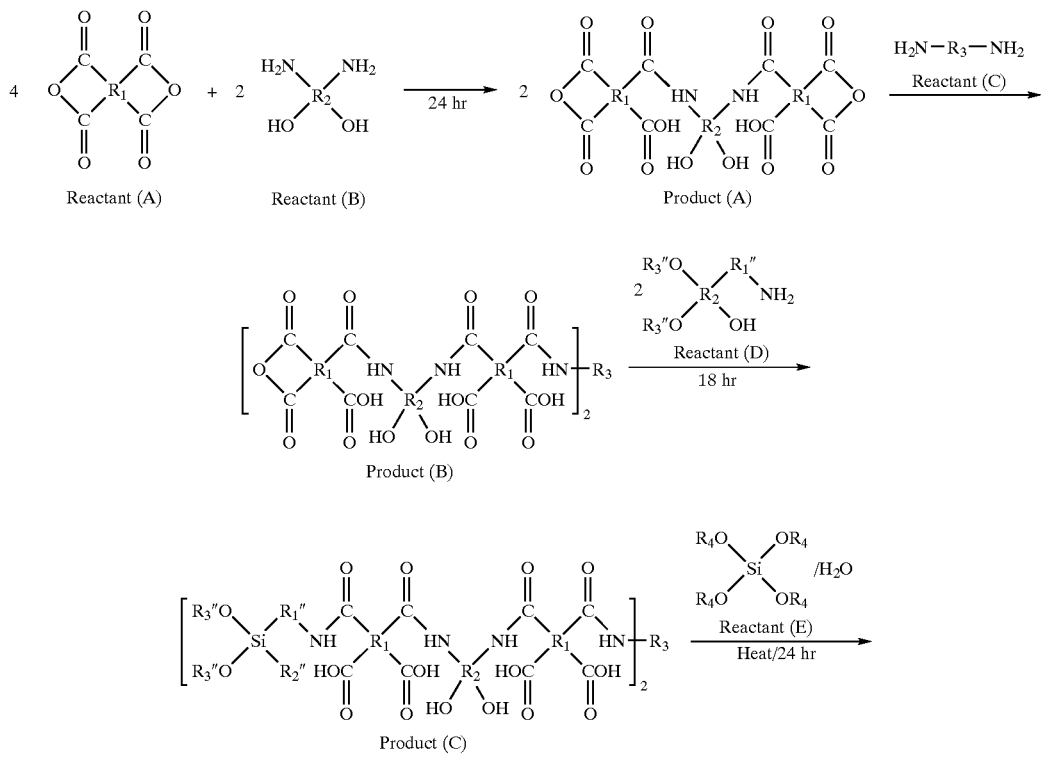

Scheme 1

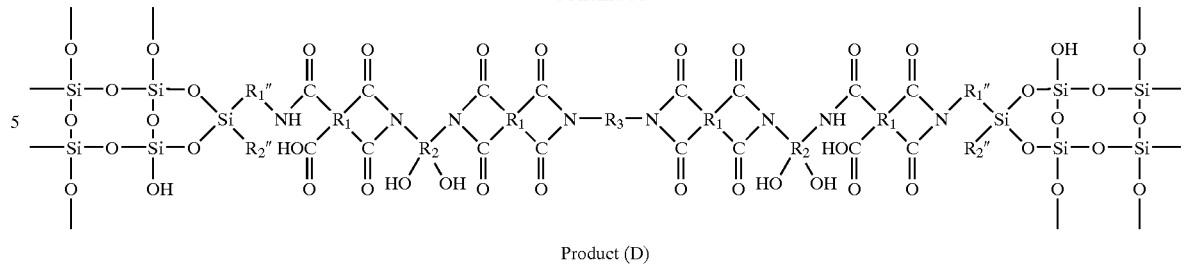

Product (D)

wherein
R₁ is from

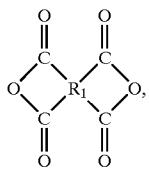

and R₁ contains a fluoro-substituent;
R₂ is from

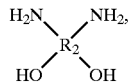

and R₂ contains a fluoro-substituent;
R₃ is

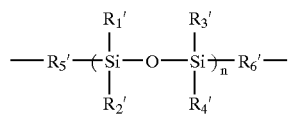

wherein R'₁ to R'₄ is C1–C4 alkyl or phenyl, R'₅ and R'₆ is C1–C6 alkylene or phenylene, and n=1~10;
R"₁ is C1–C4 alkylene or phenylene;
R"₂ is C1–C4 alkyl or phenyl;
R"₃ is C1–C4 alkyl;
R₄ is C1–C4 alkyl.

Preferably, the reactant (A) is 4,4'-(hexafluoroisopylidene)diphthalic anhydride (hereinafter abbreviated as 6FDA) or 2,2-bis[4-(3,4-dicarboxyphenoxy)phenyl]hexafluoropropane dianhydride (hereinafter abbreviated as 6FDEDA).

Preferably, the reactant (B) is 2,2'-bis(3amino-4-hydroxyphenyl)hexafluoropropane (hereinafter abbreviated as AHHFP).

Preferably, the reactant (C) is 1,3-bis(3-aminopropyl)tetramethyldisiloxane (hereinafter abbreviated as DAPrTMDS).

Preferably, the reactant (D) is 3-aminopropylmethyldiethoxysilane (hereinafter abbreviated as APrMDEOS).

Preferably, the reactant (E) is tetramethoxysilane (hereinafter abbreviated as TMOS).

Without further elaboration, it is believed that the above description has adequately enabled the present invention.

The following specific examples are, therefore, to be construed as merely illustrative, and not limitative of the remainder of the disclosure in any way whatsoever.

EXAMPLE 1

Synthesis of Product A

In a round bottomed flask filled with nitrogen, 6FDA was dissolved in a mixed solvent of N,N-dimethylacetamide (DMAc) and toluene into a 10~25 wt % 6FDA solution. The same method was used to prepare a 10~25 wt % AHHFP solution. The AHHFP solution was added into the 6FDA solution, and the resultant mixture was stirred with a stirrer at room temperature for reaction for 18~30 hours, thereby obtaining a solution of the product A.

EXAMPLE 2

Synthesis of Product B

DAPrTMDS was added to the solution of product A from Example 1, and the resulting mixture was stirred for reaction for 1~4 hours, thereby obtaining a solution of product B.

EXAMPLE 3

Synthesis of Product C

APrMDEOS was added to the solution of product B from Example 2, and the resulting mixture was stirred for reaction for 936 hours, thereby obtaining a solution of product C.

EXAMPLE 4

Synthesis of Product D

A H₂O/TMOS solution was prepared. The H₂O/TMOS solution was added to the solution of product C from Example 3 in an amount so that the resulting mixture contained 20~50 wt % of TMOS. The resulting mixture was stirred at room temperature for reaction for 18~30 hours, thereby obtaining a solution of product D. The solution of product D was poured onto a Teflon plate, where it was dried at 50~110° C. under atmospheric pressure for 18~30 hours, and u at 80~150° C. nder vacuum for 1~5 hours, at 100~300° C. under vacuum for 2~5 hours, at 200~350° C. under vacuum for 1~4 hours, and at 100~300° C. under vacuum for 1~5 hours, thereby obtaining a solid product D (fluorinated poly(siloxane amideimide)-silica hybrid).

IR Spectrum and $^{13}$-NMR Spectrum Identification of Product D

Figure 2:
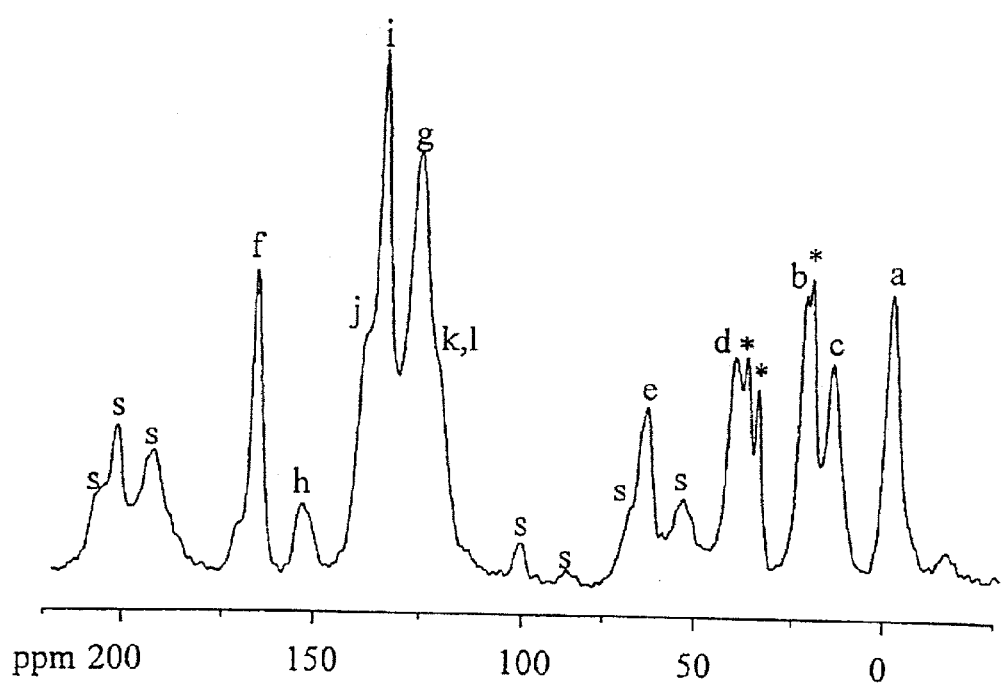
FIG. 2 is a $^{13}$C-NMR spectrum of a fluorine-containing poly(siloxane amideimide)-silica hybrid according to the present invention.

The structure of the product D was identified by an IR spectrum (FIG. 1) and a $^{13}$C-NMR spectrum (FIG. 2). The IR spectrum shows the stretching vibration of Si—OH, H$_2$O, N—H, and O—H in 2700~3500 cm$^{-1}$; a symmetric stretching vibration of imide C=O at 1778 cm$^{-1}$; an asymmetric stretching vibration of imide C=O at 1713 cm$^{-1}$; a stretching vibration of amide C=O at 1622 cm$^{-1}$; a stretching vibration of C—N at 1392 cm$^{-1}$; a planar bending vibration of imide C=O at 722 cm$^{-1}$; an absorption peak of phenyl ring at 1519 cm$^{-1}$; an asymmetric stretching vibration of cyclic Si—O—Si at 1062 cm$^{-1}$; and a stretching vibration of Si—OH at 964 cm$^{-1}$. The results identify the formation of a three-dimensional —Si—O—Si— network structure. A small amount of —SiOH group exists in this network structure, which contains an imide structure. The $^{13}$C-NMR shows that the resonance frequency of the carbon atom on the C=O of imide was 166 ppm (f); 154 ppm (h) for the carbon atom connecting to an aromatic hydroxy; 140~118 ppm (I, j, k) for aromatic carbons; 65 ppm (e) for a quaternary carbon; 41 ppm (d) for —NCH$_2$—; 21 ppm (b) for —CH$_2$—; 15 ppm (c) for —CH$_2$Si—; –1.0 ppm (a) for —SiCH$_3$; and the absorption peaks of DMAc (solvent) were 38, 35 and 20 ppm(*). The results indicate the formation of an imide structure.

$^{29}$Si-NMR Spectrum Identification of Product D

Figure 3:
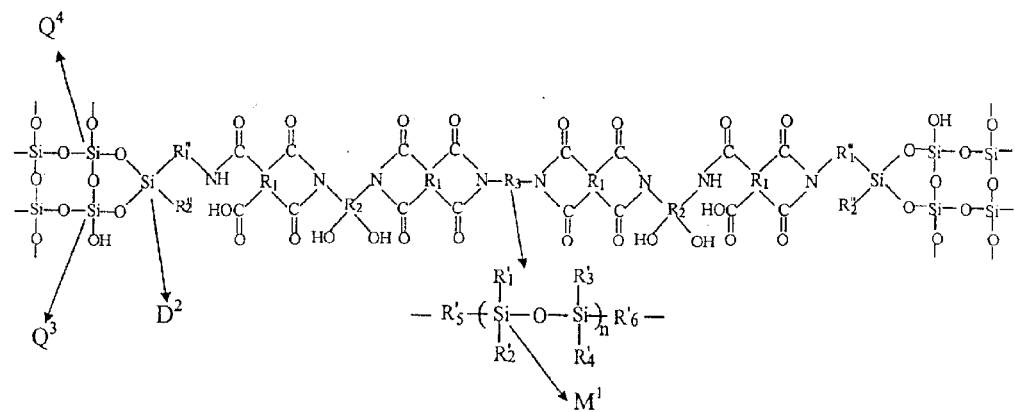
FIG. 3 is a $^{29}$Si-NMR spectrum of a fluorine-containing poly(siloxane amideimide)-silica hybrid according to the present invention.
Figure 3:
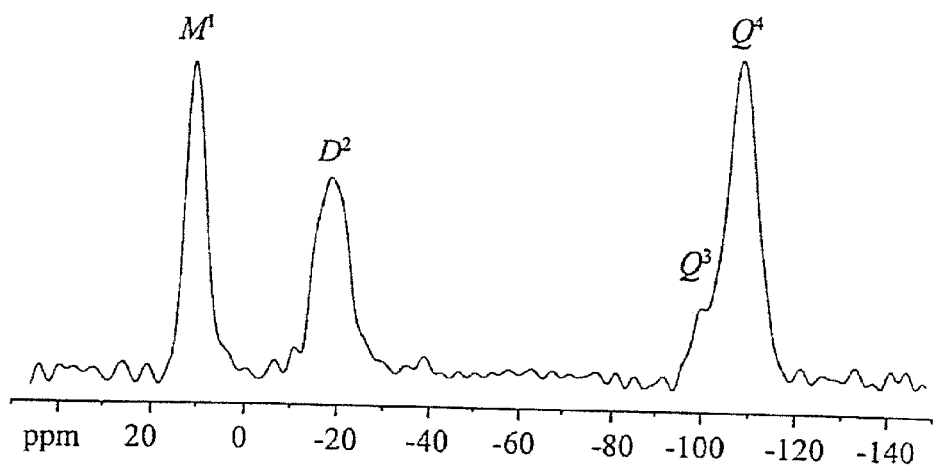

FIG. 3 is a $^{29}$Si-NNR spectrum of the product D, wherein Q$^4$ generats a resonance at –108 ppm, Q$^3$ generats a resonance at –100 ppm, D$^2$ generates a resonance at –18 ppm, M$^1$ generates a resonance at 12 ppm. Q$^4$ indicates that there are four —O—Si groups on Si and no other organic side chain (i.e. Si(OSi)$_4$). Q$^3$ indicates that there are three —O—Si groups on Si and one organic side chain (i.e. ROSi(OSi)$_3$). D$^2$ indicates that there are two —O—Si groups on Si and two organic side chains (i.e. Si(OSi)$_2$R$_2$). M$^1$ indicates that there is one —O—Si group and three organic side chains (i.e. Si(OSi)R$_3$) D$^2$ and M$^1$ are related to siloxane chain segments. The Si atoms of Q$^3$ and Q$^4$ pretain to a silica network structure. The calculations from the peak values of $^{29}$Si-NMR indicate that the conversion (D$_c$) of tetramethoxysilane was higher than 95%. Under the condition where no acid matter was added, this identified that the copolymer is an acidic polymer. A spin relaxation locking of a cross-polarization technique was used to transmit the magnetic signal of a polarized $^1$H to $^{29}$Si; and then the variation of the peak value of a Si nucleus was used to obtain a spin-lattice relaxation time, $T_{l\rho}^H$ and $$T_{1\rho}^H \text{ and } T_{1\rho}^{Si},$$

of the magnetization of $^1$H and $^{29}$Si under the cross polarizatoin time (T$_{SiH}$) and the spin coordinates of the $^1$H-$^{29}$Si. The relationship L=$\sqrt{6DT_{l\rho}^H}$ was used to obtain the length of the spin-diffusion path (L). The result indicated that the length of the spin-diffusion path did not greatly decrease along with an increase in the content of the reactant tetramethoxysilane. L, values were all smaller than 5 nm. This indicated that the distribution of the organic and inorganic components in this hybrid was rather uniform.

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

What is claimed is:

1. An organic-inorganic hybrid having the following structure:

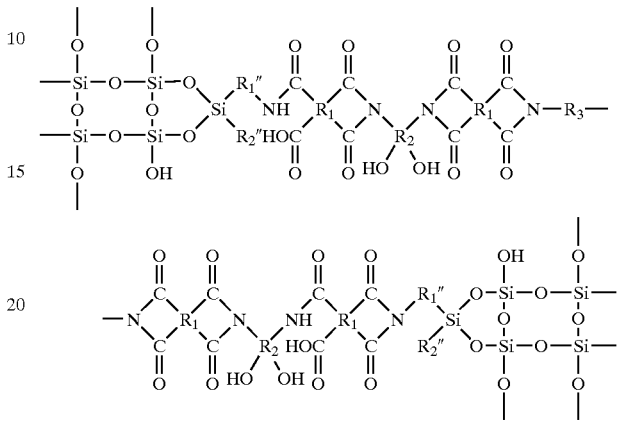

wherein

R$_1$ is an organic tetravalent residue from

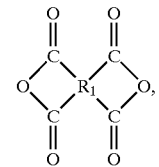

and R$_1$ contains a fluoro substituent;

R$_2$ is an organic tetravalent residue from

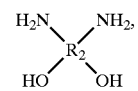

and R$_2$ contains a fluoro substituent;

R$_3$ is

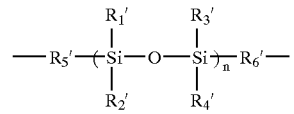

wherein R'$_1$ ,R'$_2$,R'$_3$ and R'$_4$ are C1–C4 alkyl or phenyl, R'$_5$ and R'$_6$ are C1–C6 alkylene or phenylene, and n=1~10;

R"$_1$ is C1–C4 alkylene or phenylene; and

R"$_2$ is C1–C4 alkyl or phenyl.

2. The organic-inorganic hybrid as claimed in claim 1, wherein $R_1$ is

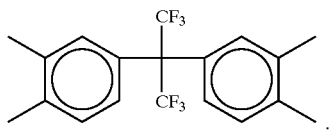

3. The organic-inorganic hybrid as claimed in claim 1, wherein $R_2$ is from

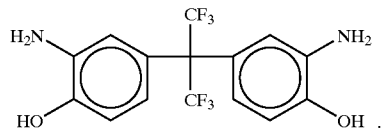

4. The organic-inorganic hybrid as claimed in claim 2, wherein $R_2$ is from

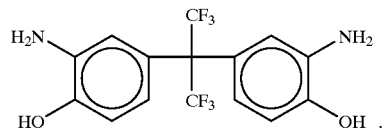

5. The organic-inorganic hybrid as claimed in claim 3, wherein $R'_1$、$R'_2$、$R'_3$ and $R'_4$ are methyl, $R'_5$ and $R'_6$ are propylene group, and n=1.

6. The organic-inorganic hybrid as claimed in claim 4, wherein $R'_1$、$R'_2$、$R'_3$ and $R'_4$ are methyl, $R'_5$ and $R'_6$ are propylene group, and n=1.

7. The organic-inorganic hybrid as claimed in claim 5, wherein $R''_1$ is a propylene group, and $R''_2$ is methyl.

8. The organic-inorganic hybrid as claimed in claim 6, wherein $R''_1$ is a propylene group, and $R''_2$ is methyl.

\* \* \* \* \*